A. W. WHITE.
Pump Valve.

No. 202,128. Patented April 9, 1878.

WITNESSES:
C. Clarence Poole
W. F. Morsell

INVENTOR:
Archibald W. White
per attys.
A. H. Evans & Co.

N. PETERS, PHOTO-LITHOGRAPHER, WASHINGTON, D. C.

UNITED STATES PATENT OFFICE.

ARCHIBALD W. WHITE, OF SAN JOSÉ, CALIFORNIA.

IMPROVEMENT IN PUMP-VALVES.

Specification forming part of Letters Patent No. 202,128, dated April 9, 1878; application filed February 25, 1878.

*To all whom it may concern:*

Be it known that I, ARCHIBALD W. WHITE, of San José, Santa Clara county, and State of California, have invented a certain Improvement in Pump-Valves; and I hereby declare the following to be a full, clear, and exact description thereof, reference being had to the accompanying drawings, making part of this specification, in which—

Figure 1:
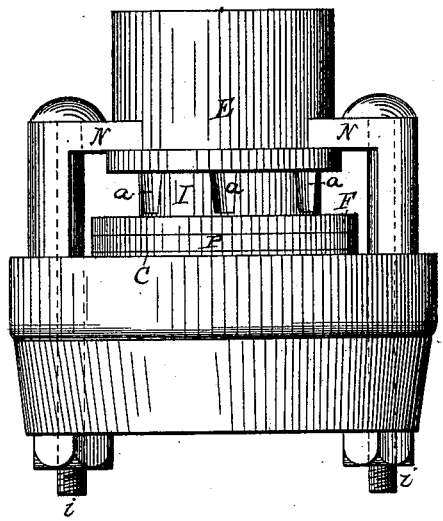
Figure 2:
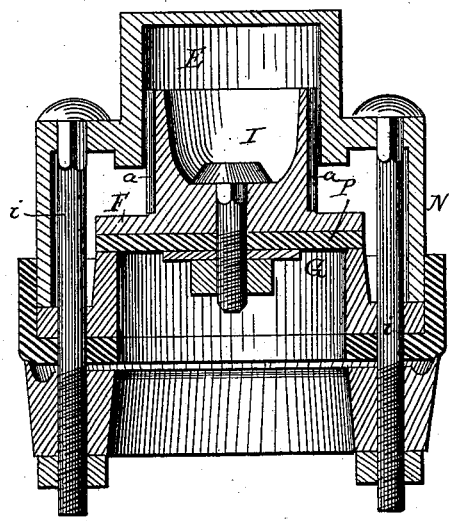

Figure 1 is a side elevation. Fig. 2 is a vertical cross-section.

The object of my invention is to provide a pump-valve which is cheap in construction and sure in operation; and it consists in a cylindrical valve, provided with a corrugated stem, so as to reduce friction to the minimum, working in a vertical cylindrical guide, held in position by a cross-piece, ears, and bolts, as hereinafter more fully described.

In order that those skilled in the art may make and use my invention, I will proceed to describe the manner in which I carry it out.

In the said drawings, G is the valve-seat in the piston of a lift-pump. It is centrally located, and rises as a lip from the main body of the piston. On the upper edge of this seat rests the packing P of a circular valve, F, corresponding in size to seat G, and provided with a vertical stem, I, having parallel corrugations $a$ $a$ throughout its length. This stem works in a cylindrical guide, E, having supports N, and securely bolted to the piston by means of bolts $i$ $i$ and proper nuts.

The inside surface of cylinder E being smooth, and the valve-stem being corrugated, it is evident that, though the stem is always truly centered, yet there is a limited amount of bearing-surface against the cylinder E to create friction.

Having thus described my invention, what I claim as new, and desire to secure by Letters Patent, is—

The cylindrical guide E, corrugated valve-stem I, and valve F, in combination with the valve-seat G, piston, and supports N, all constructed and arranged as set forth.

ARCHIBALD W. WHITE.

Witnesses:
    CHAS. C. REDMOND,
    W. MITCHELL.